United States Patent [19]

Linden

[11] Patent Number: 4,738,444

[45] Date of Patent: Apr. 19, 1988

[54] SHOCK ABSORBING MOUNTING ARRANGEMENT FOR GYMNASTIC RINGS

[76] Inventor: Gerald E. Linden, 11 Vincent Dr., Monroe, Conn. 06468

[21] Appl. No.: 840,015

[22] Filed: Mar. 17, 1986

[51] Int. Cl.[4] .............................................. A63B 7/02
[52] U.S. Cl. ...................................... 272/61; 272/141
[58] Field of Search ................... 272/61, 85, 97, 135, 272/137, 141, 142, 109, 126.78; 267/170, 166, 167, 175, 177, 70

[56] References Cited

U.S. PATENT DOCUMENTS

| | | | |
|---|---|---|---|
| 481,384 | 8/1892 | Barber | 267/70 |
| 965,838 | 7/1910 | Sanborn | 267/177 |
| 1,425,433 | 8/1922 | Zook | 272/126 |
| 2,488,534 | 11/1949 | Hagerman | 272/141 |
| 2,620,188 | 12/1952 | Malagio | 272/78 |
| 3,058,744 | 10/1962 | McGuire | 272/85 |
| 3,521,848 | 7/1970 | Aase | 272/61 |
| 3,552,695 | 1/1971 | Liesegang | 267/70 |
| 3,972,238 | 8/1976 | Thatcher | 272/141 |
| 4,480,832 | 11/1984 | Bulmash et al. | 272/137 |

FOREIGN PATENT DOCUMENTS 1018653  5/1983  U.S.S.R. .............................. 272/109

*Primary Examiner*—Richard J. Apley
*Assistant Examiner*—S. R. Crow

[57] ABSTRACT

Compression-type springs (36) are interposed between the upper attachment means (16) of a gymnastic ring set (10,12,14,16) and the suspension means (18,20) therefor. The lower ends of the springs (18,20) are attached to the suspension means (18) and the upper ends of the springs (36) are attached to the attachment means (16) so that downward forces on the ring set (10,12,14,16) causes the springs (36) to compress.

The springs (36) are precompressed so that they only displace for downward forces in excess of a threshold, such as thrice the gymnast's body weight. The spring precompression also limits the available spring displacement in a desirable manner.

13 Claims, 1 Drawing Sheet

SHOCK ABSORBING MOUNTING ARRANGEMENT FOR GYMNASTIC RINGS

BACKGROUND OF THE INVENTION

As shown in FIG. 1, a gymnastic ring set comprises two seven inch diameter rings 10, each suspended at the lower end of a strap 12. The strap 12 is typically nylon webbing. The upper end of the strap 12 is attached to the lower end of a rope 14. The rope 14 may be hemp or steel (wire). The rope 14 terminates at its upper end in suitable attachment means, such as a hook 16 which is attached to suitable suspension means, such as a swivel mounted loop 18 suspended from a fixed point 20, such as a ceiling or a free-standing, floor-mounted frame. Hereinafter, "ring set" means the ring 10, strap 12, rope 14, and attachment means 16.

The gymnast grasps the rings 10 with his hands and performs various maneuvers involving body positions both above and below the rings. During some of these maneuvers, such as those involving a transition between body positions above the rings to those below, tremendous forces may be generated. These forces may reach a magnitude of as much as EIGHT times the gymnast's weight. In the case of rings suspended either by a hemp rope or from a free-standing, floor-mounted frame, some of these forces are reacted in the rope or frame, respectively. In the case of rings suspended either by a wire rope or from a ceiling, neither of which is very resilient, these forces are reacted in the gymnast's shoulders, which may cause injury. This is especially true when the gymnast is not superbly conditioned, or when the extreme-force-generating maneuver is incorrectly performed.

DISCLOSURE OF THE INVENTION

Therefore, it is an object of this invention to provide a shock absorbing mounting arrangement for gymnastic ring sets, especially applicable to ring sets having a wire rope or suspended from a ceiling, so that diminished forces are reacted in the gymnast's shoulders, thereby reducing the potential for injury.

According to the invention, a shock absorbing apparatus is adapted to be disposed to support a gymnastic ring set with respect to the suspension means therefor so as to react generally vertical loads generated (imposed on the ring set) by a gymnast performing maneuvers on the ring set.

According to an aspect of the invention, the shock absorbing apparatus includes at least one compression-type spring that is reverse coupled to the ring set and the suspension means therefor.

According to a feature of the invention, the shock absorbing apparatus is preloaded so as to react generally vertical loads imposed by the gymnast performing maneuvers on the ring set only in excess of a threshold load. The threshold load established with regard to the anticipated weight of a gymnast performing maneuvers on the ring set, such as in excess of the gymnast's weight.

Further according to the invention, the shock absorbing apparatus is provided with a mechanism that will retain support of the ring set with respect to the suspension means in the event that the shock absorbing element of the shock absorbing apparatus were to break.

Other objects, features, and advantages of the invention will become apparent in light of the following description thereof.

DETAILED DESCRIPTION OF THE INVENTION

Figure 1:
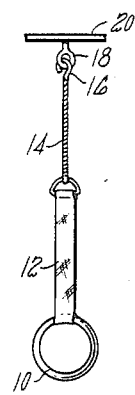
FIG. 1 is a side view of a prior art gymnastic ring arrangement.
Figure 3:
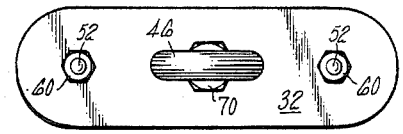
FIG. 3 is a top view of the shock absorbing apparatus of FIG. 2.
Figure 2:
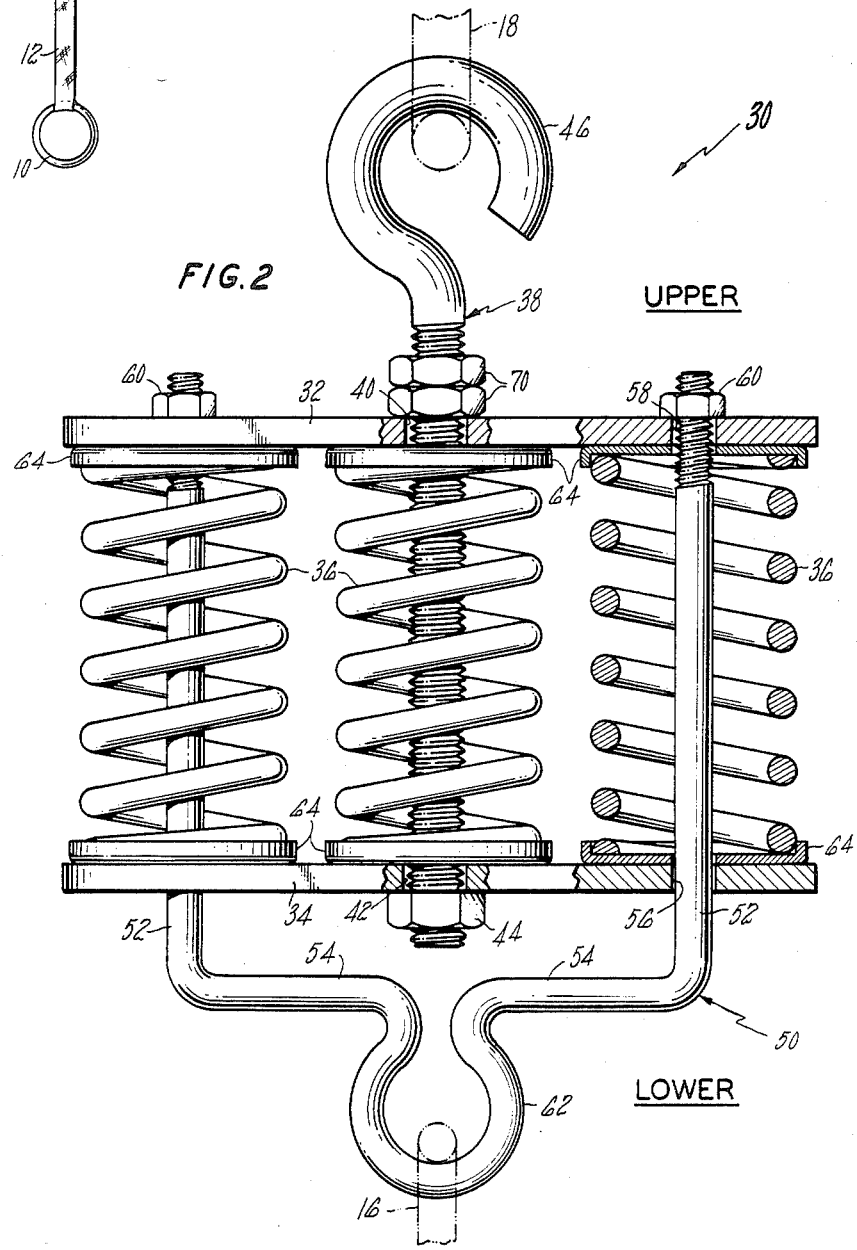
FIG. 2 is a side view, partially broken-away and partly in section, of the shock absorbing apparatus of this invention.

FIG. 2 shows the shock absorbing apparatus 30 of this invention interposed between the hook 16 and loop 18 of FIG. 1. The terms "upper" and "lower" relate to portions of the apparatus 30 or its individual elements that are ultimately disposed toward the ceiling 20 or towards the ring 10, respectively.

The shock absorbing apparatus 30 comprises two essentially identical plates, an upper plate 32 and a lower plate 34 separated by one or more compression type springs 36. It will be evident hereinafter that one, two, or three identical springs 36 may conveniently be used with each shock absorbing apparatus 30.

An eye-bolt 38 extends through holes 40 and 42 disposed in the central portions of the upper and lower plates 32 and 34, respectively. A lock nut 44, or the like, is fastened to the lower end of the eye-bolt 38, in contact with the lower surface of the lower plate 34. The upper end of the eye-bolt 38 extends past the upper surface of the upper plate 32, and terminates in an open hook 46 which is intended for hanging the shock absorbing apparatus 30 from the closed loop 18.

A U-bolt 50 has two leg portions 52 and a central bight portion 54. The bight portion 54 is disposed below the lower surface of the lower plate 34. Each leg portion 52 extends through holes 56,56 and 58,58 disposed in the end portions of the lower and upper plates 34 and 32, respectively. A lock nut 60, or the like, is fastened to the upper end of each leg portion 52, in contact with the upper surface of the upper plate 32. The bight portion 54 of the U-bolt 50 is provided with a closed loop 62, which is intended for receiving the open loop 16 at the upper end of the wire rope 14.

The springs 36 are disposed about the eye bolt 38 and the U-bolt legs 42, and are centered thereon by cup washers 64 disposed at each end of each spring, as shown.

It is readily observable that forces acting to separate the hook 46 from the loop 62 will be reacted by compression of the springs 36. Consider now the behavior of springs. A nonprogressively wound spring compresses according to the formula:

$$f = kx$$

where:
 f is the force exerted on the spring;
 k is the spring constant; and
 x is the spring displacement.

Of course, this relationship is valid only to the point where the springs "bottom out" (all coils in contact with one another) at which point no more forces will be reacted.

Consider now the example of a gymnast weighing 100 pounds performing a maneuver that generates 800 pounds of force (400 pounds in each ring set) and two springs disposed between the upper and lower plates of each shock absorbing apparatus around the leg portions of the U-bolt. Each spring has ONE inch of available displacement (before bottoming out) and a spring constant of 200 pounds per inch. It is readily calculable that a gymnast performing a 800 pound maneuver will displace all four springs one inch or, in other words will just bottom out the springs.

If three of the above-described springs are provided per shock absorbing apparatus (the third spring being disposed about the eye-bolt), a 150 pound gymnast would just bottom out the springs at 1200 pounds (eight times the gymnast's weight). The aforementioned 100 pound gymnast would cause the springs to compress only ¾ inch for an 800 pound maneuver.

There is a drawback to the above described shock absorbing apparatus 30. Vertical displacement of the rings during maneuvers is generally undesirable, especially during less severe maneuvers. This is why wire ropes are employed for top class competitors. Therefore, the springs are preloaded (precompressed) so that they do not displace during less severe maneuvers. Preloading is achieved by providing a locking arrangement, such as two nuts 70 clamped together, on the upper end of the eye-bolt 38 in contact with the upper surface of the upper plate 32, and adjusting the nuts 70 down the bolt 38 so as to compress the springs 56.

The preload could be provided in alternate manners, for instance, by providing a shoulder on the shank of the eye-bolt 38 urging against the upper surface of the upper plate 32 and a locknut arrangement (similar to 70) for the nut 44. Or, shoulders could be provided on the U-bolt legs 52 urging against the lower surface of the lower plate 34 and a locknut arrangement for the nuts 60.

Returning to the example of the 100 pound gymnast and two springs per shock absorbing apparatus (spring travel=ONE inch, spring rate =200 pounds per inch), consider that the springs are precompressed one-half inch. One-half inch times four springs times 200 pounds per inch yields a precompression of 400 pounds. This means that there will be no spring displacement, and hence no undesirable vertical displacement of the rings, when the 100 pound gymnast is performing maneuvers generating forces up to FOUR times his weight. For maneuvers generating eight times the gymnast's weight, the displacement would be only the remaining one-half inch of available spring compression, one-half of what it was without precompressing the springs.

With the same two springs per shock absorbing apparatus, and each spring preloaded one-half inch (total preload=400 pounds), there would be no vertical displacement of the rings for a 150 pound gymnast performing maneuvers up to 2⅔ times his weight. In either case, the small amount of vertical ring displacement caused by the more severe maneuvers is entirely acceptable, and is comparable to the flexure in the free-standing, floor-mounted frames that are widely used in top level competition.

Consider now the previous example of three springs per shock absorbing apparatus, with the springs preloaded one-half inch, or 600 pounds (one-half inch times six springs times 200 pounds per inch). The 150 pound gymnast would not cause vertical displacement of the rings in maneuvers up to FOUR times his body weight.

The 100 pound gymnast would not cause vertical displacement of the rings in maneuvers up to SIX times his body weight.

Thus, it is evident that the shock absorbing apparatus 30 of this invention is suitable to a wide range of gymnast weights, skill levels, and conditioning levels with a single set of identical nonprogressively wound springs, simply by using two or three springs per shock absorbing apparatus and by appropriately adjusting the amount of spring precompression. (One spring may be used for a very light gymnast).

Progressively wound springs would be advantageous, but the nonprogressively wound springs described above are more readily available.

A prototype of the shock absorbing apparatus 30 has been assembled and successfully tested. The prototype uses two springs 36 per apparatus 30, each disposed on one leg 52 of a U-shaped, 4½ inch span, ⅜ inch shackle of the type used to mount leaf springs to a trailer axle. The springs 36 have a free length of 3 inches, and are of the type used in the installation of a spring-mounted gymnastic floor exercise area. A chain repair link was looped around the central bight portion 54 of the shackle to form the lower loop 62, and a ⅜ inch eye-bolt of suitable length was used for the eye-bolt 38—its eye portion having been slightly opened to form the upper hook 46. The nuts 60 are prevented from backing off the ends of the shackle by staking the extreme ends thereof. Two cinched together nuts were used for the nut 44, and the extreme end of the eyebolt 38 was staked to prevent backoff of the nut 44. The plates 32 and 34 were made by cutting in half a shackle plate that is used in conjunction with the aforementioned shackle, and drilling the holes 40 and 42 therein (the holes 56 and 60 were already in the shackle plate).

Since the springs operate in compression through "reverse coupling" (i.e. the lower end of each spring is attached to the upper suspension point and the upper end of each spring is attached to the ring set), if a spring breaks, the shock absorbing apparatus would simply collapse—it would not fall apart.

Although the apparatus 30 has been described in terms of an upper hook 46 and a lower loop 62 for interposition between the suspension loop 18 and the hook 16, it will be readily understood that different arrangements may be substituted for the hook 46 and loop 62 as required by a particular installation.

It should be understood that symetrical arrangements of one, two, three, four, or five springs could be employed in each shock mount apparatus by providing upper and lower plates each having five holes disposed therein—a central hole for the bolt 38, and four evenly-spaced holes disposed at a radius about the central hole. One pair of diametrically opposed holes would receive the leg portions 52 of the U-bolt 50, and the other pair of diametrically opposed holes would be provided with suitable pins therebetween for receiving springs.

It is further contemplated that means other than the eye-bolt and U-bolt could be employed to place the springs in compression and that dissimilar springs could be used, for instance concentrically, to provide a suitable range of spring forces.

I claim:

1. In combination with a gymnastic ring set including attachment means for attaching the ring set to suspension means, shock absorbing apparatus adapted to be interposed between the attachment means and the suspension means, said shock absorbing apparatus comprising:
- compression spring means, including at least one compression spring, for reacting to generally vertical loads generated by a gymnast performing maneuvers on the ring set, and having an upper end and a lower end;
- hanging means for coupling the lower end of the compression spring means to the suspension means; and
- receiving means for coupling the upper end of the compression spring means to the attachment means of the ring set.

2. Apparatus according to claim 1, further comprising:
- precompression means for precompressing the at least one compression spring so that generally vertical loads generated by a gymnast performing maneuvers on the ring set are reacted by the at least one compression spring only in excess of a threshold load.

3. Shock absorbing apparatus according to claim 1;
- wherein the compression spring means includes a lower plate receiving a lower end of the at least one compression spring;
- wherein the hanging means includes means for coupling the lower plate to the suspension means;
- wherein the compression spring means includes an upper plate receiving an upper end of the at least one compression spring; and
- wherein the receiving means includes means for coupling the upper plate to the attachment means of the ring set.

4. Apparatus according to claim 3:
- wherein the hanging means includes precompression means for exerting a precompressive force on the at least one compression spring so that generally vertical loads generated by a gymnast performing maneuvers on the ring set are reacted by the at least one compression spring only in excess of a threshold load.

5. Apparatus according to claim 1 wherein the at least one compression spring has an aggregate spring rate of approximately 400-600 pounds per inch.

6. Apparatus according to claim 2 wherein the threshold load is established to be at least the anticipated weight of a gymnast performing maneuvers on the ring set.

7. In combination with a gymnastic ring set including attachment means for attaching the ring set to suspension means, shock absorbing apparatus adapted to be interposed between the attachment means and the suspension means, said shock absorbing apparatus comprising:
- spring means, adapted to be disposed to support the ring set with respect to the suspension means by interposition between the attachment means and the suspension means, for reacting to loads generated by a gymnast performing maneuvers on the ring set; and
- adjustment means for preloading the spring means so that generally vertical loads generated by a gymnast performing maneuvers on the ring set are reacted by the spring means only in excess of a threshold load.

8. Shock absorbing apparatus according to claim 7, wherein the threshold load is from two to four times the gymnast's weight.

9. In combination with a gymnastic ring set including attachment means for attaching the ring set to suspension means, shock absorbing apparatus adapted to be interposed between the attachment means and the suspension means, said shock absorbing apparatus comprising:
- spring means, adapted to be interposed between the ring set and the suspension means, for reacting to loads generated by a gymnast performing maneuvers on the ring set; and
- reverse coupling means for supporting the ring set with respect to the suspension means such that in the event that the spring means were to break the ring set would remain supported by the suspension means.

10. A method of reacting to loads generated by a gymnast performing maneuvers on a ring set, the ring set including attachment means and suspended from suspension means, comprising:
- interposing shock absorbing apparatus between the attachment means of the ring set and the suspension means, the shock absorbing means including a compression spring reverse coupled to the attachment means and the suspension means such that in the event that said spring were to break the ring set would remain supported by the suspension means.

11. A method of reacting to loads generated by a gymnast performing maneuvers on a ring set according to claim 10, further comprising:
- preloading the shock absorbing apparatus so that loads generated by a gymnast performing maneuvers on the ring set are reacted by the shock absorbing apparatus only in excess of a threshold load.

12. A method of reacting to loads generated by a gymnast performing maneuvers on a ring set according to claim 11, further comprising:
- establishing the threshold load to which the shock absorbing apparatus is preloaded to be at least the anticipated weight of a gymnast performing maneuvers on the ring set.

13. A method of reacting to loads generated by a gymnast performing maneuvers on a ring set according to claim 10, further comprising:
- providing support for the ring set with respect to the suspension means in the event that the compression spring were to break.

* * * * *